United States Patent [19]

Röhm

[11] 4,418,927
[45] * Dec. 6, 1983

[54] LOCKABLE DRILL CHUCK

[76] Inventor: Günter H. Röhm, Heinrich-Röhm-Strasse 50, 7927 Sontheim, Fed. Rep. of Germany

[*] Notice: The portion of the term of this patent subsequent to Jul. 29, 1997 has been disclaimed.

[21] Appl. No.: 278,430

[22] Filed: Jun. 29, 1981

[30] Foreign Application Priority Data

Jul. 2, 1980 [DE] Fed. Rep. of Germany ....... 3024996

[51] Int. Cl.³ .................... B23B 31/04; B23B 31/12
[52] U.S. Cl. .................................. 279/62; 279/1 K; 81/90 A
[58] Field of Search .............. 279/1 K, 60, 61, 62, 279/63, 64, 65, 56, 59, 52, 48, 116, 115; 81/90 A, 128, 114, 115

[56] References Cited

U.S. PATENT DOCUMENTS 3,363,490  1/1968  Maichen ............................ 81/128
4,214,765  7/1980  Rohm ................................. 279/60

Primary Examiner—Z. R. Bilinsky
Assistant Examiner—Thomas M. Kline
Attorney, Agent, or Firm—Karl F. Ross; Herbert Dubno

[57] ABSTRACT

A drill chuck normally has a chuck body rotatable about a chuck axis and provided at its front side with a plurality of axially forwardly projecting and radially displaceable jaws. A tightening ring rotatable on the body about the axis thereof is connected via appropriate screwthread formations to the jaws so that when this ring is rotated on the chuck body about the axis in a tightening direction the jaws are displaced radially toward each other and when rotated in an opposite loosening direction the jaws are displaced apart. In addition the chuck body is formed with a radially outwardly open groove having a rear surface and with a radially outwardly open recess spaced axially forwardly of the groove and having an inner surface extending generally perpendicularly of the chuck axis and having a front portion spaced axially from and confronting the rear surface. This groove receives a tightening ring which has rear and front edge surfaces respectively riding on the front and rear surfaces of the groove, so that the front edge surface is spaced axially from and confronts the portion of the inner surface. A locking element is rotatable in this recess about a locking axis transverse to the chuck axis between a locking position wedged tightly between the front edge surface and the portion and an angularly offset unlocked position out of engagement with the front edge surface. Thus the locking element can be rotated into the locking position to block rotation of the tightening ring on the chuck body.

8 Claims, 4 Drawing Figures

LOCKABLE DRILL CHUCK

FIELD OF THE INVENTION

The present invention relates to a drill chuck. More particularly this invention concerns a drill chuck provided with a locking mechanism for preventing it from becoming loosened during use.

BACKGROUND OF THE INVENTION

A drill chuck normally has a chuck body rotatable about a chuck axis and provided at its front side with a plurality of axially forwardly projecting and radially displaceable jaws. A tightening ring rotatable on the body about the axis thereof is connected via appropriate screwthread formations to the jaws so that when this ring is rotated on the chuck body about the axis in a tightening direction the jaws are displaced radially toward each other and when rotated in an opposite loosening direction the jaws are displaced apart.

Normally the axially forward edge of the tightening sleeve or ring is formed with an array of teeth and the chuck body is formed with a radially outwardly open bore spaced slightly ahead of this array of teeth. The tip of a chuck key can be inserted in this bore so that teeth on the chuck head mesh with the teeth of the tightening ring. The chuck key can then be rotated to bring considerable torque to bear on the tightening ring and make the chuck very tight. Normally the tightening ring is a heavy cast element formed with the gear teeth for cooperation with the chuck key and with the screwthreads thereof for moving the jaws. The tightening sleeve that is fixed to this is a much lighter sheet-metal element and serves mainly to allow fast opening and closing of the chuck by hand.

When such a drill chuck is subjected to considerable vibration, as in a hammer drill, it can frequently loosen. Complex ratchet devices have been proposed to counter this tendency. The extra cost of these arrangements is normally excessive, and they also normally allow a small amount of loosening until the mechanism locks in a ratchet position.

OBJECTS OF THE INVENTION

It is therefore an object of the present invention to provide an improved drill chuck.

Another object is to provide a lockable or nonloosening chuck which can be locked in any position and which can be manufactured at low cost.

SUMMARY OF THE INVENTION

These objects are attained according to the instant invention in a chuck of the above-described general type, but wherein the chuck body is formed with a radially outwardly open groove having a rear surface and with a radially outwardly open recess spaced axially forwardly of the groove and having an inner surface extending generally perpendicularly of the chuck axis and having a front portion spaced axially from and confronting the rear surface. This groove receives the tightening ring which has rear and front edge surfaces respectively engaging or riding on the front and rear surfaces of the groove, so that the front edge surface is spaced axially from and confronts the portion or the inner surface. A locking element is rotatable in this recess about a locking axis transverse to the chuck axis between a locking position wedged tightly between the front edge surface and the portion and an angularly offset unlocked position out of engagement with the front edge surface. Thus the locking element can be rotated into the locking position to block rotation of the tightening ring on the chuck body.

Thus with the system according to the instant invention a single moving part—the locking element—can solidly arrest the tightening ring and sleeve in any position on the chuck body. Since the force the locking element exerts on the tightening element is axial of the drill rotation axis, and the element must be rotated about a radial axis to loosen, vibration cannot normally be effective to rotate the locking element and loosen the chuck.

According to another feature of this invention the element and bore or recess receiving it are centered on a radial axis. The locking element is formed with a polygonal-section recess extending along this radial axis and radially of the chuck axis. This recess is axially offset from the ring and allows a tool to be inserted into the element to rotate it and lock or unlock the chuck. This tool according to the instant invention may simply be formed by a polygonal-section end of the chuck-key handle. Thus once the chuck is tightened with this chuck key, it is turned around and is used to rotate the locking element to lock the chuck.

The locking element can be formed according to this invention as a stepped plug having a small-diameter inner portion and an eccentric large-diameter outer portion. The inner portion is snugly received in an inner portion of a radially outwardly open stepped bore in the chuck body and the outer portion is loosely received in a larger-diameter outer portion of this bore. When rotated this outer portion can bear peripherally on the front edge surface of the ring to lock it in place.

It is also possible according to this invention to use as a locking element a nonround and normally eliptical disk. The chuck body is formed with a cylindrical hole whose diameter is slightly more than the major diameter of this disk. The front edge of the tightening ring, however, extends chordally across this cylindrical hole. Thus when the eliptical locking element is rotated in the cylindrical bore, it can be wedged axially tightly between the front edge surface of the tightening ring and the frontmost portion of the inner wall of the cylindrical bore.

The system according to the instant invention can be produced at very low cost. The tightening sleeve, which is used only for manual operation of the chuck, can be made inexpensively of sheet metal, and the rest of the chuck can similarly be of standard construction, while still being lockable in any position.

DESCRIPTION OF THE DRAWING

The above and other objects, features, and advantages will become more readily apparent from the following, reference being made to the accompanying drawing in which.

SPECIFIC DESCRIPTION

Figure 1:
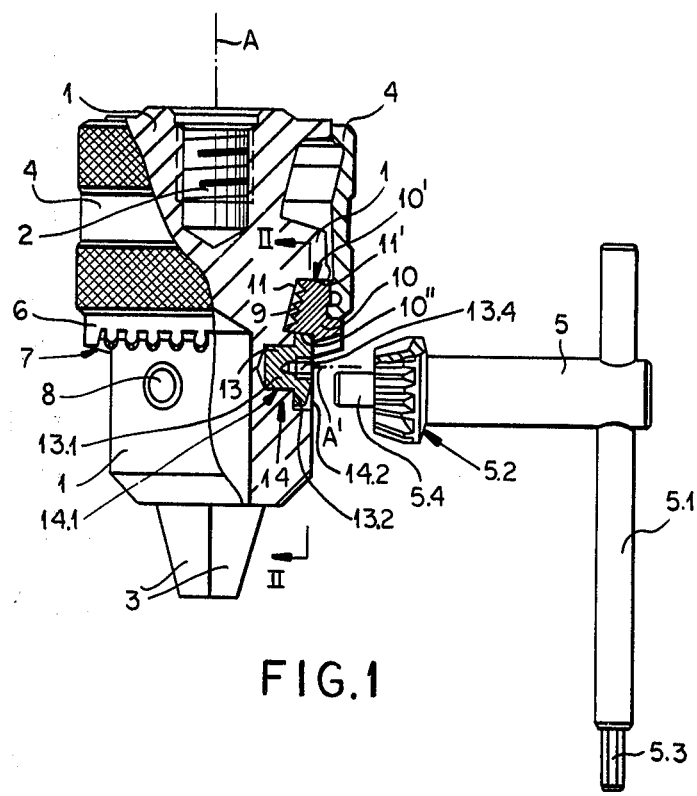
FIG. 1 is a side partly sectional view of a chuck and key according to the instant invention.

As seen in FIG. 1 a chuck according to the instant invention has a chuck body 1 centered on an axis A and formed at its rear side with an axially backwardly open threaded bore 2 adapted to be screwed over the drive spindle of a drill. Projecting from its front side are three identical jaws 3 that ride as is well known in the art on respective guides that are inclined relative to the axis A so that when the jaws 3 move axially forwardly they move radially inwardly and vice versa.

A tightening sleeve 4 centered on the axis A carries at its front end a tightening ring 10 received in a radially outwardly open groove 11 formed in the body 1. The ring 4 is made in two parts to allow it to be mounted in place and the sleeve 10 holds these two parts together. This ring 10 further has an inner surface forming a continuation of the above-described unillustrated jaw guides and formed with a screwthread 9 that meshes with corresponding screwthreads formed on the outer surfaces of the jaws 3 as well as a planar annular rear surface 10' and parallel annular front surface 10" respectively riding on similar front and rear surfaces 11' and 11" of the groove 11. As the sleeve 4 and ring 10 are rotated clockwise, as seen from above in the drawing, the jaws 3 are moved axially forwardly and radially inwardly, and when rotated counterclockwise they are moved axially backwardly and radially outwardly, as is standard in the art.

The ring 4 has a front edge 6 formed with an array of teeth 7 and the chuck body 1 is formed with at least one radially outwardly open cylindrical bore 8 spaced axially somewhat forward of the teeth 7. A chuck key 5 has a cylindrical tip 5.4 that can fit in the bore 8 and a toothed head 5.2 that can mesh with the teeth 7 when this tip 5.4 is inserted in the bore 8. The chuck key 5 further has a transverse handle 5.1 that can be gripped by the user for tightening or loosening the chuck in the manner also well known in the art.

According to the instant invention the chuck body 1 is also formed with a radially outwardly open stepped bore 14 having a small-diameter cylindrical inner portion 14.1 and a large-diameter cylindrical outer portion 14.2 both centered on an axis A' perpendicular to and intersecting the axis A. A stepped eccentric plug 13 is received in this bore 14 and has a small-diameter inner portion 13.1 and a larger-diameter outer portion 13.2. The inner portion 13.1 is centered on the axis A and is of only slightly smaller diameter than the bore portion 14.1. The larger-diameter portion 13.2 is of somewhat smaller diameter than the portion 14.2 and is centered on an axis parallel to but slightly offset from the axis A'. Thus as the plug 13 is rotated in the hole 14 the outer surface 13.3 of the portion 13.2 will move relative to the front edge surface 10" of the ring 10. The plug 13 is formed centered on the axis A' with a radially outwardly open hexagonal recess 13.4 having facets 13.5.

The handle 5.1 of the key 5 has a hexagonal-section end 5.3 that can fit snugly in the recess 13.4. The handle end 5.3 can therefore be engaged in the recess 13.4 which is axially slightly forward of the teeth 7 so that the chuck key 5 can be used to rotate this eccentric plug in the stepped bore 14. Once a tool has been tightly clamped by the jaws 3, normally by torquing the chuck tight with the key 5, the tip 5.4 of the key 5 is withdrawn from the bore 8 and the handle end 5.3 is inserted in the hole 13.4. The plug 13 is then rotated until the outer surface 13.3 of the large-diameter portion 13.2 bears axially tightly against the surface 10" of the ring 10. This action effectively locks the ring 10 and sleeve 4 against rotation about the axis A relative to the body 1.

Figure 2:
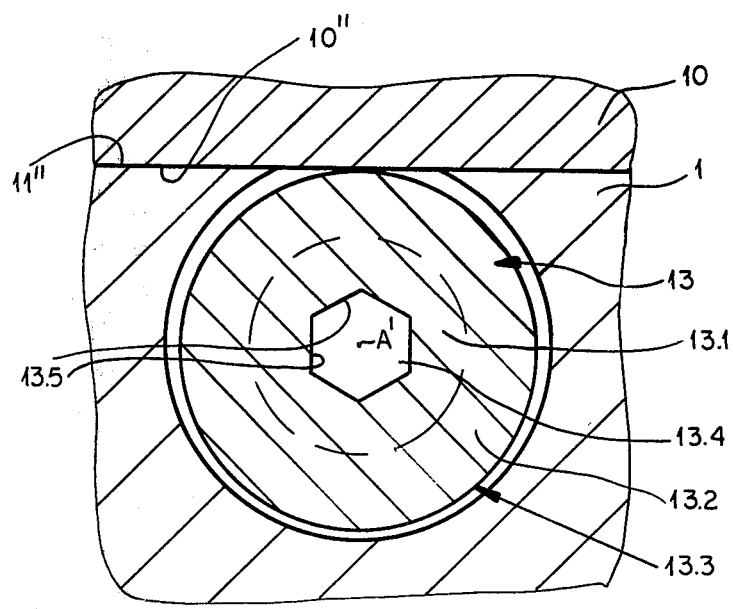
FIG. 2 is a large-scale section taken along line II—II of FIG. 1.
Figure 3:
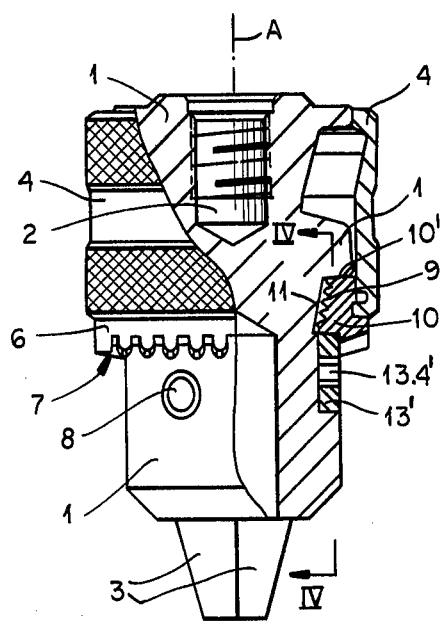
FIG. 3 is a view similar to FIG. 1 showing another chuck according to this invention.
Figure 4:
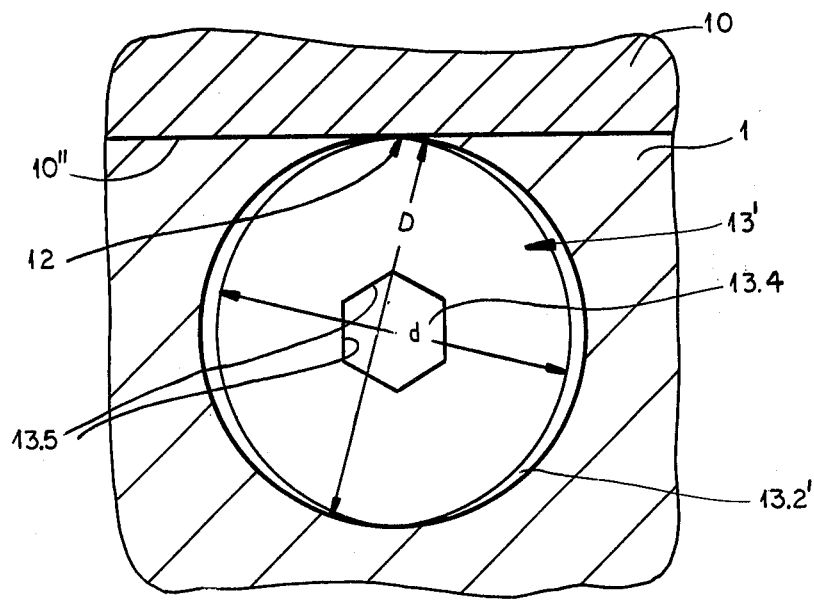
FIG. 4 is a large-scale section taken along line IV—IV of FIG. 3.

FIGS. 3 and 4 show an arrangement substantially indentical to that of FIGS. 1 and 2 and the same reference numerals are employed for functionally identical structure. Here, however, the plug 13 is replaced by an elliptical disk 13' having a major diameter D and a minor diameter d. This disk 13' has an outer surface 13.2' that can bear axially backwardly against the surface 10" and axially forwardly against the frontmost portion of the inner surface of a cylindrical recess 12 receiving the disk 13'.

This arrangement therefore functions substantially the same as that of FIGS. 1 and 2. The end 5.3 of the key 5 is inserted in the socket 13.4 and it is rotated through about 90° between a locking position wedged tightly between the surface 10" and the surface 13.2' and a position out of substantial engagement with the surface 10'.

With both arrangements the force exerted by the element 13 or 13' is purely axial and in line with most of the vibration the chuck will be subjected to. Thus rotation of these elements by such vibration to unlock the chuck is virtually impossible. In addition both of the locking elements 13 and 13' are axially somewhat overlapped by the axial front edge or rim 6 of the ring 10 so that they are effectively captured and cannot fall out. In fact the system according to the instant invention only constitutes a single moving part added to an otherwise conventional chuck. Thus the lockable chuck of this invention can be produced at low cost.

Thus with the system according to the instant invention it is possible to lock up the chuck very tightly so that self-loosening is comletely ruled out. The chuck can be locked in any position.

I claim:
1. A drill chuck comprising:
   a chuck body rotatable about a chuck axis and formed with a radially outwardly open groove having a rear surface and with a radially outwardly open recess spaced axially forwardly of said groove and having an inner surface extending generally perpendicularly of said chuck axis and spaced axially from said rear surface;
   a plurality of jaws radially displaceable on said body;
   a tightening ring rotatable on said body about said axis, received in said groove, and having a rear edge engaging said rear surface and a front edge spaced axially from said inner surface;
   means including interengaging formations on said jaws and on said ring for radially displacing said jaws inwardly toward one another when said ring is rotated on said body in a tightening direction and for radially displacing said jaws outwardly away from each other when said ring is rotated on said body in a loosening direction opposite said tightening direction; and
   a locking element rotatable in said recess about a locking axis transverse to said chuck axis between a locking position wherein said element is, wedged axially tightly between said front edge and said inner surface and an angularly offset unlocked position wherein said element is substantially out of engagement with said front edge, whereby when said locking element is in said locking position it blocks rotation of said tightening ring on said chuck body.

2. The chuck defined in claim 1 wherein said recess has a small-diameter cylindrical inner recess portion centered on a radial axis and a large-diameter outer recess portion, said locking element having a small-diameter cylindrical inner element portion centered on said radial axis and received in said inner recess portion and a larger-diameter outer element portion eccentric to said inner element portion, received in said outer recess portion, and having an outer surface engageable with said front edge, whereby said locking element is rotatable between said locking and unlocked positions.

3. The chuck defined in claim 1 wherein said locking element is rotatable about a radial axis in said recess and has a noncircular outer edge surface engageable with said front edge and with said inner surface, whereby said locking element is rotatable between said locking and unlocked positions.

4. The chuck defined in claim 3 wherein said locking element is substantially of elliptical shape.

5. The chuck defined in claim 1 wherein said locking element is formed centerally with a radially outwardly open polygonal-section recess, whereby a tool can be fitted into said recess to rotate said locking element between its said positions.

6. The chuck defined in claim 5, further comprising a chuck key having a handle having a polygonal-section end complementary to said polygonal-section recess of said locking element, whereby said handle constitutes said tool.

7. The chuck defined in claim 1 wherein said tightening ring has a front rim axially overlapping said locking element, whereby said rim holds said locking element in place.

8. The chuck defined in claim 7 wherein said rim is toothed.

* * * * *